US012752197B2

(12) United States Patent
Furukawa

(10) Patent No.: US 12,752,197 B2
(45) Date of Patent: Oct. 6, 2026

(54) PROGRAM, METHOD AND INFORMATION PROCESSING APPARATUS

(71) Applicant: BANK OF INNOVATION, INC., Tokyo (JP)

(72) Inventor: Takahiro Furukawa, Tokyo (JP)

(73) Assignee: BANK OF INNOVATION, INC., Tokyo (JP)

( * ) Notice: Subject to any disclaimer, the term of this patent is extended or adjusted under 35 U.S.C. 154(b) by 173 days.

(21) Appl. No.: 18/483,985

(22) Filed: Oct. 10, 2023

(65) Prior Publication Data

US 2024/0033646 A1 Feb. 1, 2024

Related U.S. Application Data

(63) Continuation of application No. PCT/JP2022/011530, filed on Mar. 15, 2022.

(30) Foreign Application Priority Data

Apr. 14, 2021 (JP) ................................ 2021-068168

(51) Int. Cl.
*A63F 13/795* (2014.01)
*A63F 13/53* (2014.01)
*A63F 13/69* (2014.01)

(52) U.S. Cl.
CPC ............ *A63F 13/795* (2014.09); *A63F 13/53* (2014.09); *A63F 13/69* (2014.09)

(58) Field of Classification Search
CPC ......... A63F 13/795; A63F 13/53; A63F 13/69
See application file for complete search history.

(56) References Cited

U.S. PATENT DOCUMENTS

2015/0065241 A1* 3/2015 McCarthy ........... G07F 17/3272 463/31

FOREIGN PATENT DOCUMENTS

JP 2016-010613 A 1/2016
JP 6714757 B1 6/2020

OTHER PUBLICATIONS

Stardew Valley Wiki, 2016, "https://stardewvalleywiki.com/Stardew_Valley_Wiki" (Year: 2016).*

(Continued)

*Primary Examiner* — Jay Trent Liddle
*Assistant Examiner* — Jose Angeles
(74) *Attorney, Agent, or Firm* — Studebaker Brackett PLLC

(57) ABSTRACT

A game program causes a processor to execute the steps of presenting a first game field associated with a first player to the first player; matching the first player and a second player different from the first player based on an input operation of the first player and an input operation of the second player; and associating a specific game object shared by the first and second players with the matched first player and second player. In the presenting step, the first game field is presented to the first player with both a game object that only the first player can operate and the specific game object arranged in the first game field.

10 Claims, 11 Drawing Sheets

(56) References Cited

OTHER PUBLICATIONS

Farm Together Wiki, Farm Together, Feb. 22, 2020, https://farmtogether.fandom.com/wiki/Multiplayer?diff=prev&oldid=10119 (Year: 2020).*

Tsuchida, Yoneichi; "Let's set up a multi-server with Minecraft!"; 1st Edition; Mar. 11, 2017; pp. 62-66.

International Search Report issued in PCT/JP2022/011530; mailed May 17, 2022.

* cited by examiner

FIG. 4

2021

| PLAYER INFORMATION DATABASE | | | | | | | | | | |
|---|---|---|---|---|---|---|---|---|---|---|
| USER ID | NAME | AGE | SEX | BIRTHPLACE | BLOOD TYPE | ACCOUNT CREATION DATE | POSSESSED COIN COUNT | MATCHED PERSON COUNT | . . . | LAST LOGIN DATE |
| U001 | TANAKA | 20 | MALE | HOKKAIDO | A | YYYY/MM/DD | 8000 | 2 PERSONS | . . . | YYYY/MM/DD |
| U002 | SUZUKI | 24 | FEMALE | AOMORI | B | YYYY/MM/DD | 9000 | 3 PERSONS | . . . | YYYY/MM/DD |
| U003 | HAYASHI | 40 | MALE | AKITA | O | YYYY/MM/DD | 12000 | 1 PERSON | . . . | YYYY/MM/DD |
| U004 | YANAGI | 30 | MALE | TOKYO | AB | YYYY/MM/DD | 5000 | 1 PERSON | . . . | YYYY/MM/DD |
| . . . | . . . | . . . | . . . | . . . | . . . | . . . | . . . | . . . | . . . | . . . |

2022

| MATCHING INFORMATION DATABASE | | | | | | |
|---|---|---|---|---|---|---|
| MATCHING ID | USER ID_1 | USER ID_2 | MATCHING DATE | MATCHING CANCELLATION DATE | . . . | STATUS |
| M001 | U001 | U002 | 2021/01/01 | - | . . . | MATCHED |
| M002 | U001 | U005 | 2021/01/02 | - | . . . | MATCHED |
| M003 | U003 | U002 | 2021/01/03 | 2021/01/05 | . . . | MATCHING CANCELED |
| M004 | U004 | U006 | 2021/01/04 | - | . . . | MATCHED |
| . . . | . . . | . . . | . . . | . . . | . . . | . . . |

2023

| PERSONAL GARDEN INFORMATION DATABASE | | | | | | |
|---|---|---|---|---|---|---|
| PERSONAL GARDEN ID | USER ID | CREATION DATE | UPDATING DATE | INSTALLED FACILITY OBJECT LIST | . . . | GARDEN STATUS |
| PG001 | U001 | 2021/01/01 | 2021/02/01 | PGO001 | . . . | OPEN |
| PG002 | U002 | 2021/01/02 | 2021/02/02 | PGO002 | . . . | OPEN |
| PG003 | U003 | 2021/01/03 | 2021/01/05 | PGO003 | . . . | DELETED |
| . . . | . . . | . . . | . . . | . . . | . . . | . . . |

2024

| SHARED GARDEN INFORMATION DATABASE | | | | | | |
|---|---|---|---|---|---|---|
| SHARED GARDEN ID | MATCHING ID | CREATION DATE | UPDATING DATE | INSTALLED FACILITY OBJECT LIST | . . . | GARDEN STATUS |
| SG001 | M001 | 2021/01/01 | 2021/02/01 | SGO001 | . . . | OPEN |
| SG002 | M002 | 2021/01/02 | 2021/02/01 | SGO002 | . . . | OPEN |
| SG003 | M003 | 2021/01/03 | 2021/01/05 | SGO003 | . . . | DELETED |
| . . . | . . . | . . . | . . . | . . . | . . . | . . . |

FIG. 5

2025

| FACILITY OBJECT DATABASE | | | | | | | | |
|---|---|---|---|---|---|---|---|---|
| FACILITY OBJECT ID | FACILITY OBJECT NAME | CREATION DATE | WHICH GARDEN | FACILITY OBJECT LEVEL | FACILITY OBJECT ATTRIBUTE | ID OF HARVEST GROWN AT FACILITY OBJECT | . . . | FACILITY OBJECT COORDINATE POSITION |
| O001 | FIELD | YYYY/MM/DD | SG001 | Lv5 | HARVEST | HA001 | . . . | (X,Y,Z) |
| O002 | FIELD | YYYY/MM/DD | PG001 | Lv3 | HARVEST | HA004 | . . . | (X,Y,Z) |
| O003 | FIELD | YYYY/MM/DD | SG002 | Lv10 | HARVEST | HA002 | . . . | (X,Y,Z) |
| O004 | FIELD | YYYY/MM/DD | PG002 | Lv2 | HARVEST | HA001 | . . . | (X,Y,Z) |
| . . . | . . . | . . . | . . . | . . . | . . . | . . . | . . | . . . |

2026

| FACILITY OBJECT LIST DATABASE FOR PERSONAL GARDEN | | |
|---|---|---|
| PERSONAL GARDEN FACILITY OBJECT LIST ID | PERSONAL GARDEN ID | FACILITY OBJECT ID |
| PGO_001 | PG001 | O002 |
| | | O102 |
| | | O103 |
| PGO_002 | PG002 | O004 |
| | | O005 |
| . . . | . . . | . . . |

2027

| FACILITY OBJECT LIST DATABASE FOR SHARED GARDEN | | |
|---|---|---|
| SHARED GARDEN FACILITY OBJECT LIST ID | SHARED GARDEN ID | FACILITY OBJECT ID |
| SGO_001 | SG001 | O001 |
| | | O102 |
| | | O103 |
| SGO_002 | SG002 | O004 |
| | | O005 |
| . . . | . . . | . . . |

2028

| HARVEST DATABASE | | | | | | |
|---|---|---|---|---|---|---|
| HARVEST ID | HARVEST NAME | TIME REQUIRED FOR HARVEST | NUMBER OF PIECES TO BE OBTAINED UPON HARVEST | COINS TO BE OBTAINED WHEN HARVEST IS SOLD | . . . | LOWEST LEVEL OF FACILITY OBJECT CAPABLE OF PLANTING HARVEST |
| HA001 | CARROTS | X MINUTES | X PIECES | 100 COINS | . . . | Lv1 |
| HA002 | GRAPES | X HOURS | X PIECES | 2000 COINS | . . . | Lv10 |
| HA003 | APPLES | X HOURS | X PIECES | 3000 COINS | . . . | Lv15 |
| HA004 | CABBAGES | X MINUTES | X PIECES | 10 COINS | . . . | Lv2 |
| . . . | . . . | . . . | . . . | . . . | . . . | . . . |

FIG. 10
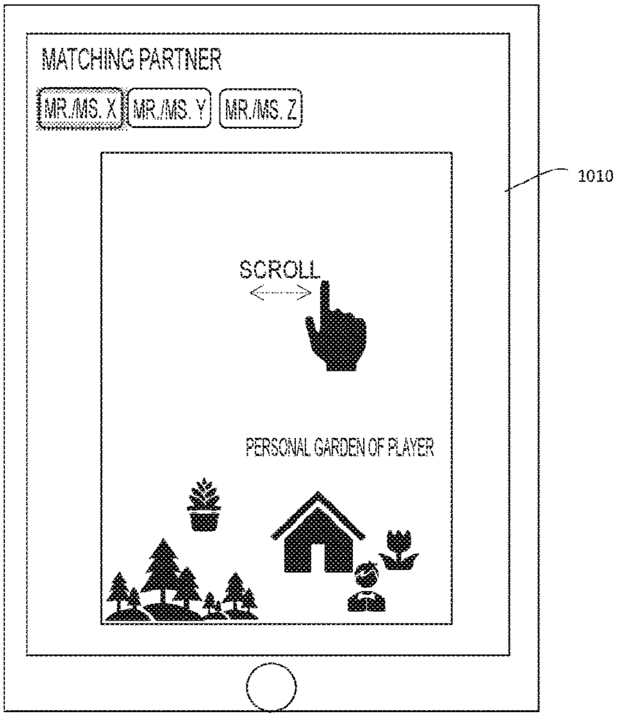
SINCE PERSONAL GARDEN AND SHARED GARDEN ARE CONTINUOUS, MOVEMENT IS POSSIBLE JUST BY SCROLLING ON DISPLAY OF TERMINAL DEVICE
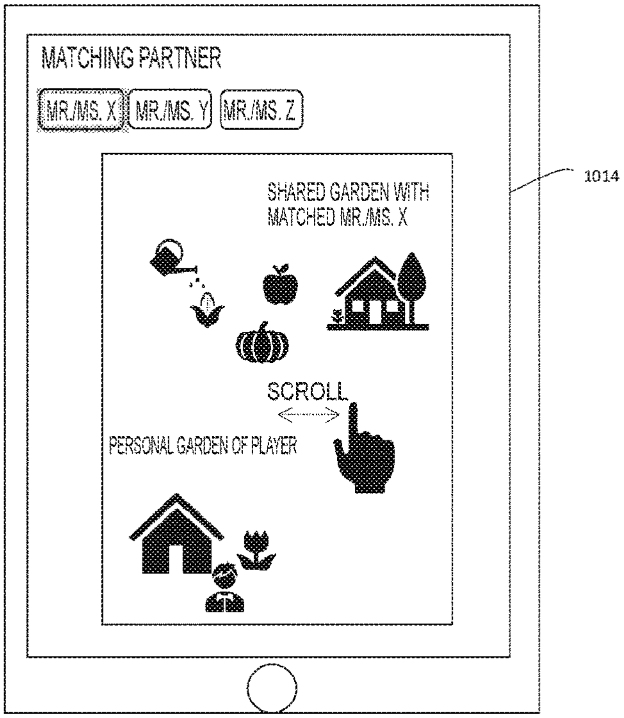

PROGRAM, METHOD AND INFORMATION PROCESSING APPARATUS

CROSS-REFERENCE TO RELATED APPLICATIONS

The present application is a continuation based on PCT Application No. PCT/JP2022/011530, filed on Mar. 15, 2022, which claims the benefit of Japanese Patent Application No. 2021-068168 filed on Apr. 14, 2021. The content of which is incorporated by reference herein in their entirety.

TECHNICAL FIELD

The present disclosure relates to program, method and information processing apparatus.

BACKGROUND ART

In recent years, a game program is provided by a provider on a smartphone or the like, and typically, a user installs and plays a game.

Among game categories, there is a genre called a construction and management simulation game or a town building simulation game. In a game of the genre, a player can advance the game by arranging an object of a facility which produces products, an object for decorations, or the like in a game space.

In addition, in recent years, as an application for smartphones or the like, an online dating application capable of finding a matching partner has been provided. Through the online dating application, users can communicate and interact with each other.

Patent Literature 1 describes a matching service which matches players in a game and in which the players increase intimacy through the game. Patent Literature 1 describes a technology of combining a game function with a matching function and realizing a matching system capable of providing a wide range of meeting opportunities.

CITATION LIST

Patent Literature

Patent Literature 1: Japanese Patent Application Laid-Open No. 6714757

DISCLOSURE OF INVENTION

In a case of a town building simulation game in which players install game objects in their game spaces, a function of visiting the game space associated with other players registered as friends may be provided.

In a matching service for increasing intimacy among players through a game, it is also important to continue the matching of the matched players and urge interaction between them. Therefore, in order to support more increasement of the intimacy among the players, a technology of further improving operation experiences of the players is needed.

According to one embodiment shown in present disclosure, a game program to be executed by a computer including a processor, the game program causing the processor to execute the steps of: presenting a first game field associated with a first player to the first player; matching the first player and a second player different from the first player based on an input operation of the first player and an input operation of the second player; and associating a specific game object shared by the first player and the second player with the matched first player and second player. In the presenting step, the first game field is presented to the first player with both a game object that only the first player can operate and the specific game object arranged in the first game field.

According to the present disclosure, on a screen operated by the player, the game object which is associated with the player himself/herself and is operable only by the player and the game object that the player shares with the other matched player are both arranged. Therefore, it is made further easier for the player to refer to the game object shared with the other matched player, and the operation to the shared game object is also made further easier. Thus, operation experiences of the player can be improved.

BRIEF DESCRIPTION OF DRAWINGS

FIG. 4 is a diagram illustrating a data structure of a database stored by the server.

FIG. 5 is a diagram illustrating a data structure of a database stored by the server.

FIG. 10 is a diagram illustrating a screen example when the game field with the matching partner is scrolled.

DESCRIPTION OF EMBODIMENTS

Figure 1:
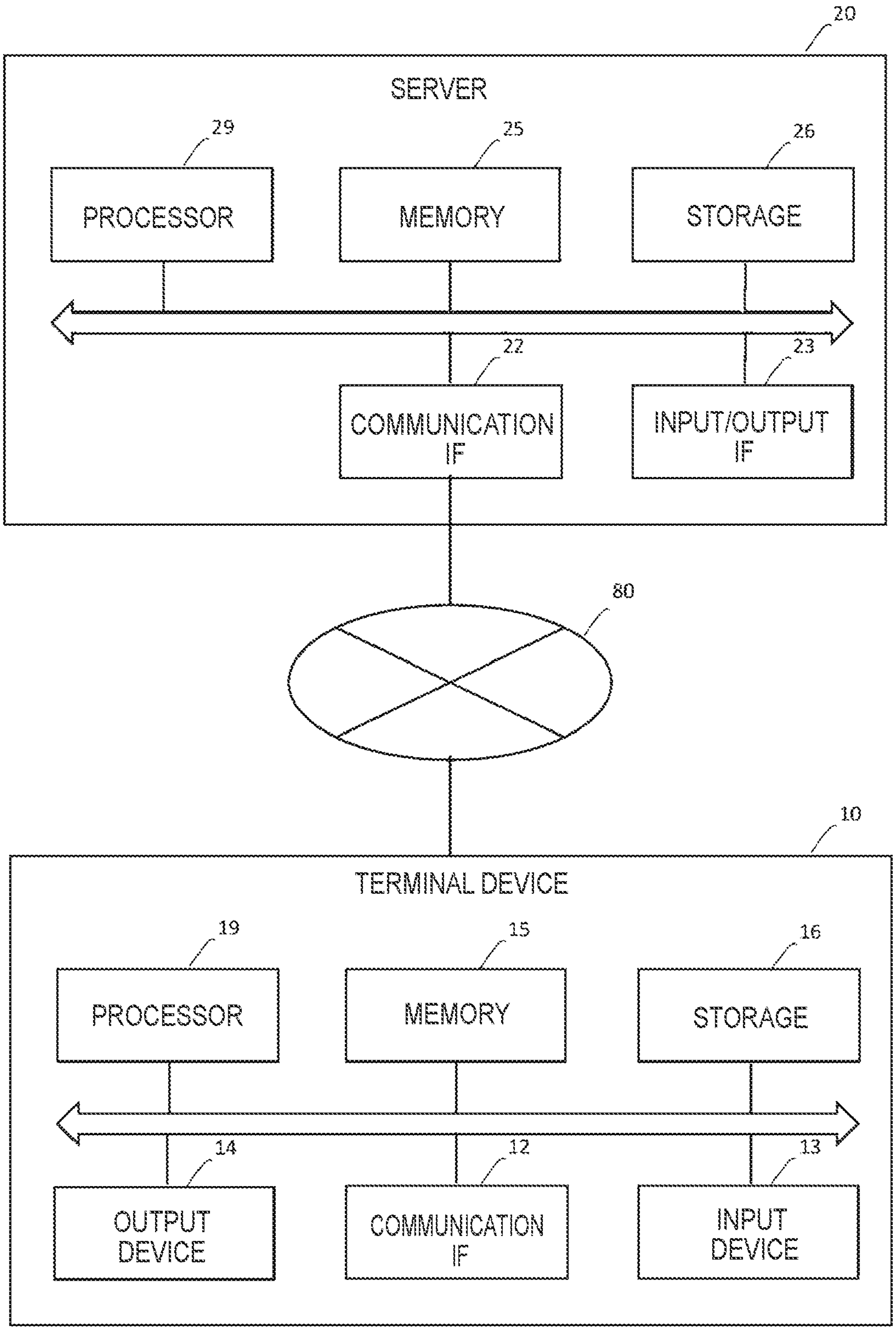
FIG. 1 is a diagram illustrating an entire configuration of a game distribution system of an embodiment.

In the following, embodiments of the present invention are described with reference to figures. In all of the figures for explaining embodiments, the same reference numerals are used for parts having the same function, and repeated descriptions are not given.

Outline of First Embodiment

In the present embodiment, a user operates a terminal device (a smartphone, for example) loaded with a touch screen, and advances a game while transmitting and receiving data related to the game between a game server and the smartphone. The game content is a town building simulation type game including a matching function with other players, and a player installs a game object by performing an operation of installing the game object. The game object (for example, a field, a factory, a commercial facility, a mining facility, a house and a public facility) produces products (such as farm products and currency which can be utilized in the game). The player can acquire assets (such as materials, raw materials and funds in the game) by performing an operation of harvesting the products.

In the present embodiment, by preparing an area (so-called "shared space") to arrange the game object that the player shares with the other matched player and an area ("personal space") to arrange the game object associated only with the player in a game field, seamless movement can be performed according to a scroll operation by the player. In the present embodiment, time and labor of the player for switching game spaces can be reduced.

<1.1 Configuration Diagram of Entire System>

FIG. 1 is a block diagram illustrating an example of an entire configuration of a game distribution system 1 of the embodiment. As illustrated in FIG. 1, the game distribution system 1 includes a terminal device 10 used by a user and a server 20, and the devices are mutually communicably connected by a network 80. While one terminal device 10 is exemplified in the illustrated example, the individual user severally operates the terminal device 10.

In the example in FIG. 1, the terminal device 10 used by a user is illustrated. The terminal device 10 is a terminal including a touch screen.

The terminal device 10 provides the user with an environment of playing a game according to a game program by executing the game program. The terminal device 10 installs the game program via a platform which distributes an application or the like, for example. The terminal device 10 enables play of the game by the user by executing the game program installed in the terminal device 10 or a pre-installed game program. By reading and executing the game program, the terminal device 10 connects communication between the terminal device 10 and the server 20 and transmits and receives data related to the game between the terminal device 10 and the server 20 according to progress of the game.

The server 20 advances the game play in the terminal device 10 by appropriately transmitting the data required for the game play to the terminal device 10. The server 20 manages various kinds of data related to the game of the user who plays the game. The server 20 communicates with the terminal device 10 and transmits images, voice and text data, or the like to the terminal device 10 according to the progress of the game of the individual user.

For example, the server 20 manages the various kinds of data such as information of an icon which appears in the game, information of an item usable by the individual user among the players who appear in the game, and profile information of the players who appear in the game. In addition, the server 20 performs processing of notifying the user of information related to management of the game such as a campaign, occurrence of a defect in the progress of the game and resolution of the defect to the user by a manager of the game.

The terminal device 10 includes a communication IF (Interface) 12, an input device 13, an output device 14, a memory 15, a storage 16 and a processor 19.

The communication IF 12 is an interface for the terminal device 10 to communicate with an external device and to input and output signals.

The input device 13 is a device (for example, a touch panel, a touch pad, a pointing device such as a mouse, and a keyboard) for accepting an input operation from the user who is the player.

The output device 14 is a device (such as a display and a speaker) for presenting the information to the user.

The memory 15 is for temporarily storing a program, data or the like processed by the program, or the like, and is a volatile memory such as a DRAM (Dynamic Rando Access Memory) for example.

The storage 16 is for preserving the data and is a flash memory or an HDD (Hard Disc Drive) for example.

The processor 19 is hardware for executing an instruction set described in the program, and is configured by an arithmetic unit, a register, a peripheral circuit, and the like.

The server 20 is a device which manages the information of the player who plays the game, a progress situation of the game, or the like.

The server 20 includes a communication IF 22, an input/output IF 23, a memory 25, a storage 26, and a processor 29.

The communication IF 22 is an interface for the server 20 to communicate with the external device and to input and output signals.

The input/output IF 23 functions as an interface with an input device for accepting the input operation from the user and an output device for presenting the information to the user.

The memory 25 is for temporarily storing a program, data or the like processed by the program, or the like, and is a volatile memory such as a DRAM (Dynamic Rando Access Memory) for example.

The storage 26 is for preserving the data and is a flash memory or an HDD (Hard Disc Drive) for example.

The processor 29 is hardware for executing an instruction set described in the program, and is configured by an arithmetic unit, a register, a peripheral circuit, and the like.

<1.2 Functional Configuration of Terminal Device 10>

Figure 2:
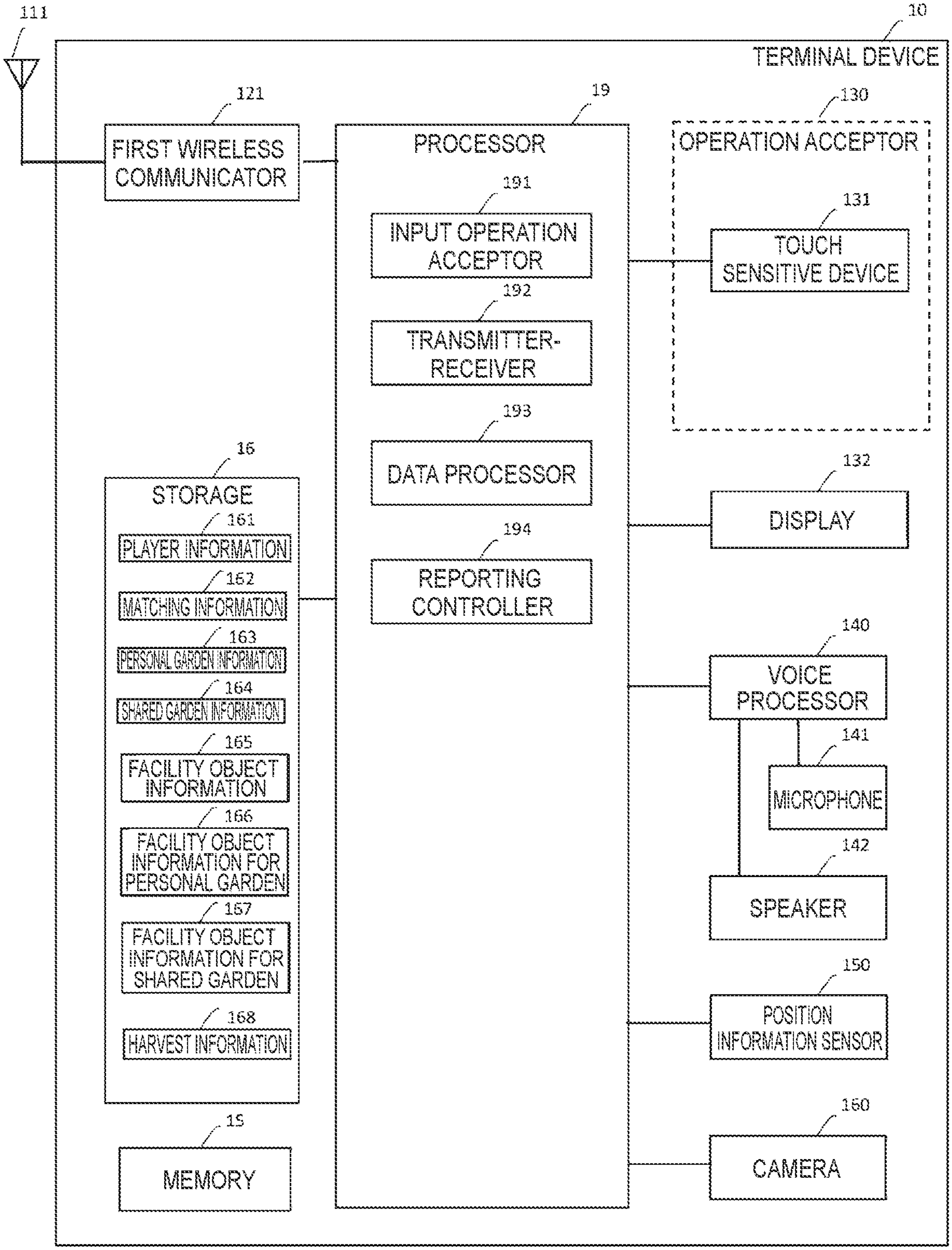
FIG. 2 is a block diagram illustrating a functional configuration of a terminal device.

FIG. 2 is a block diagram illustrating the functional configuration of the terminal device 10. As illustrated in FIG. 2, the terminal device 10 includes an antenna 111, a first wireless communicator 121, the processor 19 (including an input operation acceptor 191, a transmitter-receiver 192, a data processor 193 and a reporting controller 194), an operation acceptor 130 (including a touch sensitive device 131), the storage 16 (including player information 161, matching information 162, personal garden information 163, shared garden information 164, facility object information 165, facility object information 166 for a personal garden, facility object information 167 for a shared garden, and harvest information 168), the memory 15, a display 132, a voice processor 140, a microphone 141, a speaker 142, a position information sensor 150, and a camera 160.

The antenna 111 radiates signals originated by the terminal device 10 into space as radio waves. In addition, the antenna 111 receives the radio waves from the space and supplies reception signals to the first wireless communicator 121.

The first wireless communicator 121 performs modulation/demodulation processing or the like for transmitting and receiving signals via the antenna 111 or the like, for the terminal device 10 to perform communication with other communication devices. The first wireless communicator 121 is a communication module for wireless communication including a tuner and a high frequency circuit or the like, performs modulation/demodulation and frequency conversion of wireless signals transmitted and received by the terminal device 10, and supplies the reception signals to the processor 19.

The processor 19 controls an operation of the terminal device 10 by reading and executing the program stored in the storage 16. The processor 19 is realized by an application processor for example.

The operation acceptor 130 has a mechanism for accepting the input operation of the user. Specifically, the operation acceptor 130 is configured as the touch screen. The touch sensitive device 131, using the device of an electrostatic capacity scheme for example, detects an approach of a finger of the user or the like.

The storage 16 is configured by a flash memory, a RAM (Random Access Memory), or the like, and stores the program used by the terminal device 10, the various kinds of data, or the like received from the server 20 by the terminal device 10.

The display 132 displays the data of images, moving images, text, or the like according to control of the processor 19. The display 132 is realized by a display device such as an LCD (Liquid Crystal Display) and organic EL (Electroluminescence).

The voice processor 140 modulates and demodulates voice signals. The voice processor 140 modulates signals supplied from the microphone 141 and supplies modulated signals to the processor 19. In addition, the voice processor 140 supplies the voice signals to the speaker 142.

The microphone 141 accepts voice input and supplies the voice signals corresponding to the voice input to the voice processor 140.

The speaker 142 converts the voice signals supplied from the voice processor 140 to voice and outputs the voice to the outside of the terminal device 10.

The position information sensor 150 is a sensor which detects a position of the terminal device 10, and is a GPS (Global Positioning System) module for example. The GPS module is a reception device used in a satellite positioning system.

The camera 160 is a device for receiving light by a photodetector and performing output as a photographed image.

<1.3 Functional Configuration of Server 20>

Figure 3:
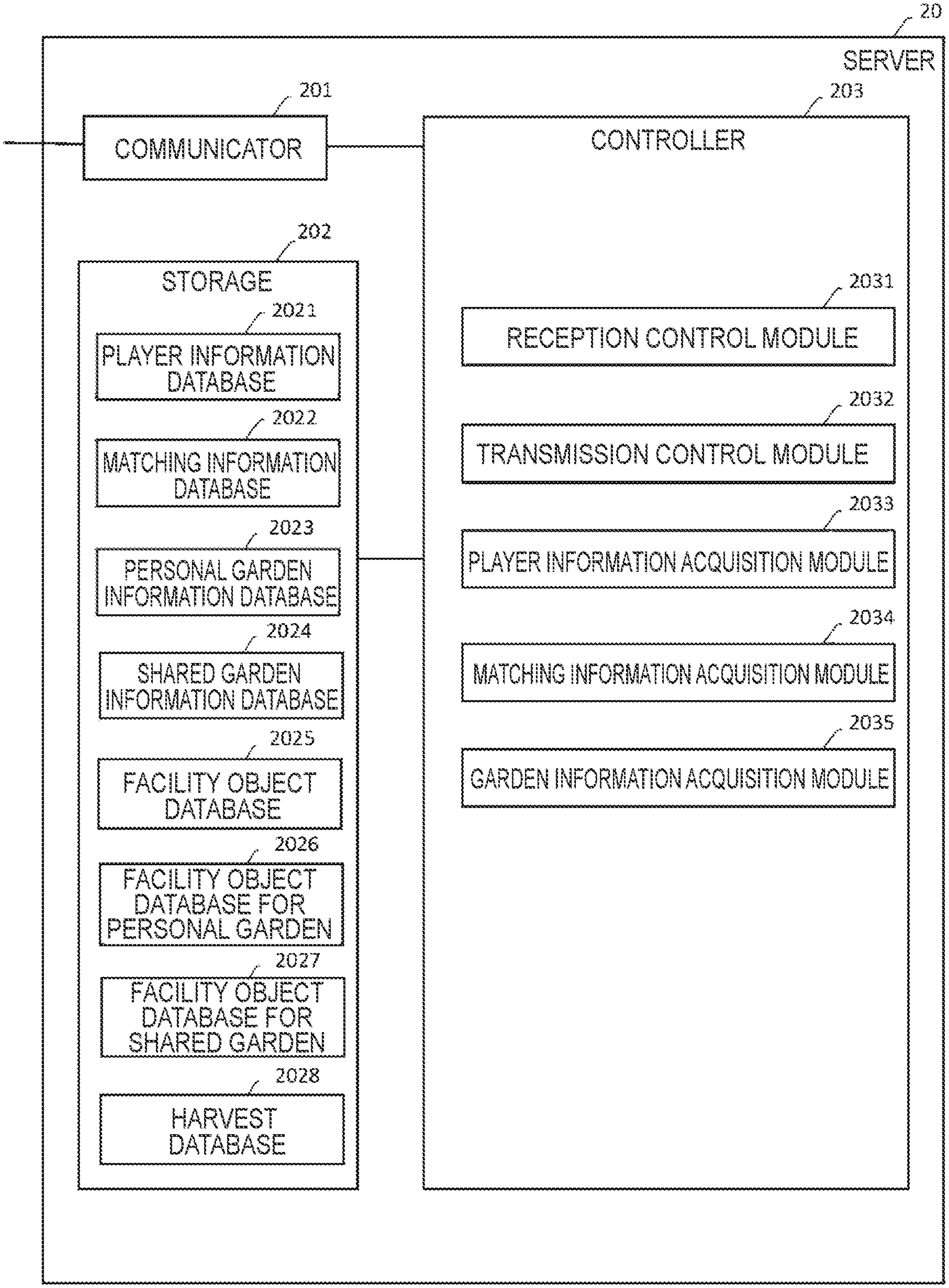
FIG. 3 is a block diagram illustrating a functional configuration of a server.

FIG. 3 is a diagram illustrating the functional configuration of the server 20. As illustrated in FIG. 3, the server 20 functions as a communicator 201, a storage 202 (including a player information database 2021, a matching information database 2022, a personal garden information database 2023, a shared garden information database 2024, a facility object database 2025, a facility object list database 2026, a facility object list database 2027 and a harvest database 2028), and a controller 203 (including a reception control module 2031, a transmission control module 2032, a player information acquisition module 2033, a matching information acquisition module 2034, and a garden information acquisition module 2035).

The communicator 201 performs processing for the server 20 to communicate with the external device.

The storage 202 stores various kinds of databases such as the player information database 2021, the matching information database 2022, the personal garden information database 2023, the shared garden information database 2024, the facility object database 2025, the facility object list database 2026 for the personal garden, and the facility object list database 2027 for the shared garden and the harvest database 2028.

The player information database 2021 is a database for managing the information of the player. Details thereof will be described later.

The matching information database 2022 is a database for managing the information of matching. Details thereof will be described later.

The personal garden information database 2023 is a database for managing the information of the personal garden. The personal garden is a game field allocated to the user and is the game field where the user can install an object associated with the user himself/herself, acquire in-game assets such as coins from the installed object, or the like. Details thereof will be described later.

The shared garden information database 2024 is a database for managing the information of the shared garden. The shared garden is a game field allocated to the matched individual users and is the game field where the matched users can install a shared object associated with the matched users, acquire the in-game assets such as coins from the installed object, or the like. Details thereof will be described later.

The facility object database 2025 is a database for managing the information of a facility object. Details thereof will be described later.

The facility object list database 2026 for the personal garden is a database for managing the information of the facility object in the personal garden. Details thereof will be described later.

The facility object list database 2027 for the shared garden is a database for managing the information of the facility object in the shared garden. Details thereof will be described later.

The controller 203 is realized by the processor 29 reading the program stored in the storage 202 and executing an instruction included in the program. The controller 203 functions illustrated as the reception control module 2031, the transmission control module 2032, the player information acquisition module 2033, the matching information acquisition module 2034 and the garden information acquisition module 2035 by performing the operation according to the program.

The reception control module 2031 controls the processing that the server 20 receives signals from the external device according to a communication protocol.

The transmission control module 2032 controls the processing that the server 20 transmits signals to the external device according to the communication protocol.

The player information acquisition module 2033 performs a series of processing for managing the information of the player.

The matching information acquisition module 2034 performs a series of processing for associating the plurality of users with each other.

The garden information acquisition module 2035 performs a series of processing for managing the information of the gardens that appear in the game.

<2 Data Structure>

FIG. 4 and FIG. 5 are diagrams illustrating the data structure of the databases stored by the server 20. Note that FIG. 4 is an example and does not exclude the data which is not described.

The player information database 2021 in FIG. 4 includes a subfield “user ID”, a subfield “name”, a subfield “age”, a subfield “sex”, a subfield “birthplace”, a subfield “blood type”, a subfield “account creation date”, a subfield “possessed coin count”, a subfield “matched person count”, and a subfield “last login date”.

The subfield “user ID” indicates identification information imparted to the user.

Specifically, the subfield “user ID” is an ID unique to the user, which is required when managing the game program.

The subfield “name” indicates a name or a nickname specified by the user.

The subfield “age” indicates an age specified by the user.

The subfield “sex” indicates sex specified by the user.

The subfield “birthplace” indicates a birthplace specified by the user.

The subfield “blood type” indicates a blood type specified by the user.

The subfield "account creation date" indicates a date on which the user creates an account.

The subfield "possessed coin count" indicates an amount of virtual currency (also referred to as "coins") that is held by the user and is usable in the game.

The subfield "matched person count" indicates a count of the other users who are matched with the user.

Specifically, for the subfield "matched person count", the count of people who can be matched has an upper limit.

The subfield "last login date" indicates the date on which the user logs in the game last.

The matching information database 2022 in FIG. 4 includes a subfield "matching ID", a subfield "user ID_1", a subfield "user ID_2", a subfield "matching date", a subfield "matching cancellation date", and a subfield "status".

The subfield "matching ID" indicates the identification information imparted to matching.

Specifically, the subfield "matching ID" is an ID unique to the matching, which is required when managing the game program.

The subfield "user ID_1" indicates the user ID of the one matched user (first player).

The subfield "user ID_2" indicates the user ID of the other matched user (second player).

The subfield "matching date" indicates the date on which the matching is established.

The subfield "matching cancellation date" indicates the date on which the matching is canceled.

The subfield "status" indicates a status of the matching.

Specifically, the status of the matching is the information indicating that they are matched or the matching is already canceled.

The personal garden information database 2023 in FIG. 4 includes a subfield "personal garden ID", the subfield "user ID", a subfield "creation date", a subfield "updating date", a subfield "installed facility object list", and a subfield "garden status".

The subfield "personal garden ID" is the identification information imparted to the personal garden. The personal garden is the game field allocated to the user and is the game field where the user can install an object associated with the user himself/herself, acquire the in-game assets such as coins from the installed object, or the like.

Specifically, the subfield "personal garden ID" is an ID unique to the personal garden, which is required when managing the game program.

The subfield "user ID" indicates the identification information imparted to the user. Specifically, the subfield "user ID" is the ID unique to the user, which is required when managing the game program.

The subfield "creation date" indicates the date on which the personal garden is created.

The subfield "updating date" indicates the date on which the personal garden is updated.

The subfield "installed facility object list" indicates a list of the facility objects installed in the personal garden.

Specifically, details of the list of the facility objects in the personal garden will be described later for the facility object list database 2026 for the personal garden in FIG. 5.

The subfield "status" indicates the status of the personal garden.

Specifically, the subfield "status" is the information indicating the status of the personal garden being open, already deleted, or the like.

The shared garden information database 2024 in FIG. 4 includes a subfield "shared garden ID", the subfield "matching ID", the subfield "creation date", the subfield "updating date", the subfield "installed facility object list", and the subfield "garden status".

The subfield "shared garden ID" is the identification information imparted to the shared garden. The shared garden is the game field allocated to the matched individual users and is the game field where the matched users can install a shared object associated with the matched users, acquire the in-game assets such as coins from the installed object, or the like.

Specifically, the subfield "shared garden ID" is an ID unique to the shared garden, which is required when managing the game program.

The subfield "matching ID" indicates the identification information imparted to the user.

Specifically, the subfield "matching ID" is the ID unique to the user, which is required when managing the game program.

The subfield "creation date" indicates the date on which the shared garden is created.

The subfield "updating date" indicates the date on which the shared garden is updated.

The subfield "installed facility object list" indicates the list of the facility objects installed in the shared garden.

Specifically, details of the list of the facility objects in the shared garden will be described later for the facility object list database 2027 for the shared garden in FIG. 5.

The subfield "status" indicates the status of the shared garden.

Specifically, the subfield "status" is the information indicating the status of the shared garden being open, already deleted, or the like.

The facility object database 2025 in FIG. 5 includes a subfield "facility object ID", a subfield "facility object name", the subfield "creation date", a subfield "which garden", a subfield "facility object level", a subfield "facility object attribute", a subfield "ID of harvest grown at facility object", and a subfield "facility object coordinate position".

The subfield "facility object ID" indicates the identification information imparted to the facility object.

Specifically, the subfield "facility object ID" is an ID unique to the facility object, which is required when managing the game program.

The subfield "facility object name" indicates the name of the facility object.

The subfield "creation date" indicates the date on which the facility object is created.

The subfield "which garden" indicates which garden the facility object is of. The facility object is installed in the personal garden or the shared garden by the user.

The subfield "facility object level" indicates a level of the facility object.

Specifically, for the subfield "facility object level", following processing is performed to the individual users according to the level of the facility object installed in the shared garden.

A range that each matched user can browse a profile of a partner is changed according to the level of the facility object of the shared garden. For example, as the level of the facility object of the shared garden increases, the range of the profile of the partner that the corresponding user can browse is enlarged.

The amount of the in-game assets that each matched user can acquire from the facility object is changed according to the level of the facility object of the shared garden. For example, as the level of the facility object is higher, the number, type and production speed of the objects that can be produced at the facility object are improved.

The subfield "facility object attribute" indicates an attribute of the facility object.

The subfield "harvest ID" indicates an ID of the harvest grown at the facility object.

Details of the subfield "harvest ID" will be described later for the harvest database 2028 in FIG. 5.

The subfield "facility object coordinate position" indicates a coordinate position of the facility object.

Specifically, the information of the coordinate position of the facility object includes the information of coordinates in the personal garden or the shared garden of the individual users.

The facility object list database 2026 for the personal garden in FIG. 5 includes a subfield "personal garden facility object list ID", the subfield "personal garden ID", and the subfield "facility object ID".

The subfield "personal garden facility object list ID" indicates the information which identifies the facility object list of the personal garden.

Specifically, the subfield "personal garden facility object list ID" is an ID unique to the facility object list of the personal garden, which is required when managing the game program.

The subfield "personal garden ID" is the identification information imparted to the personal garden. The personal garden is the game field allocated to the user and is the game field where the user can install an object associated with the user himself/herself, acquire the in-game assets such as coins from the installed object, or the like.

Specifically, the subfield "personal garden ID" is the ID unique to the personal garden, which is required when managing the game program.

The subfield "facility object ID" indicates the identification information imparted to the facility object.

Specifically, the subfield "facility object ID" is the ID unique to the facility object, which is required when managing the game program.

The facility object list database 2027 in the shared garden in FIG. 5 includes a subfield "shared garden facility object list ID", the subfield "shared garden ID", and the subfield "facility object ID".

The subfield "shared garden facility object list ID" indicates the information which identifies the facility object list of the shared garden.

Specifically, the subfield "shared garden facility object list ID" is an ID unique to the facility object list of the shared garden, which is required when managing the game program.

The subfield "shared garden ID" is the identification information imparted to the shared garden. The shared garden is the game field allocated to the matched individual users and is the game field where the matched users can install a shared object associated with the matched users, acquire the in-game assets such as coins from the installed object, or the like.

Specifically, the subfield "shared garden ID" is the ID unique to the shared garden, which is required when managing the game program.

The subfield "facility object ID" indicates the identification information imparted to the facility object.

Specifically, the subfield "facility object ID" is the ID unique to the facility object, which is required when managing the game program.

The harvest database 2028 in FIG. 5 includes the subfield "harvest ID", a subfield "harvest name", a subfield "time required for harvest", a subfield "number of pieces to be obtained upon harvest", a subfield "coins to be obtained when harvest is sold", and a subfield "lowest level of facility object capable of planting harvest".

The subfield "harvest ID" indicates the identification information imparted to the harvest.

Specifically, the subfield "harvest ID" is the ID unique to the harvest, which is required when managing the game program.

The subfield "harvest name" indicates the name of the harvest.

The subfield "time required for harvest" indicates the time required before the harvest can be harvested.

The subfield "coins to be obtained when harvest is sold" indicates the information of the coins to be obtained when the harvest is sold.

Specifically, for the subfield "coins to be obtained when harvest is sold", the obtained coins can be used in an exclusive garden of the individual player.

The subfield "lowest level of facility object capable of planting harvest" indicates the lowest level of the facility object capable of planting the harvest.

Operation of First Embodiment

Next, the operations of the individual devices configuring the game distribution system 1 will be explained.

Figure 6:
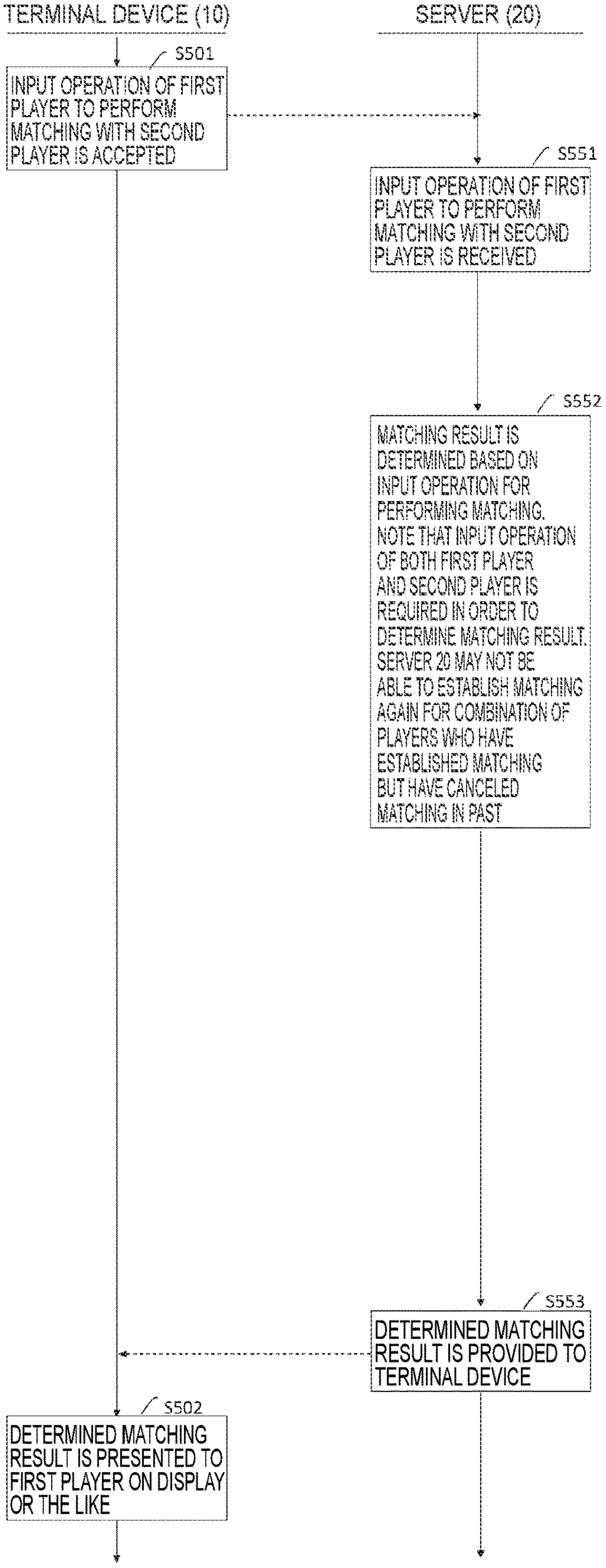
FIG. 6 is a diagram illustrating a flow of related processing of matching.

FIG. 6 is a diagram illustrating a flow of matching related processing.

In step S501, the terminal device (10) accepts the input operation of the first player to perform the matching with the second player.

In step S551, the server (20) receives the input operation of the first player to perform the matching with the second player.

In step S552, the server (20) determines a matching result based on the input operation for performing the matching.

The server (20) updates the matching information database 2022 by accepting the operation of matching with the second player from the first player. For example, in the state where the first player and the second player are not matched in the matching information database 2022, first, in response to acceptance of the operation that the first player specifies the second player, the server (20) makes the subfield "user ID_1" hold the identification information of the first player, and makes the subfield "user ID_2" hold the identification information of the second player.

Note that the server (20) requires the input operation of both of the first player and the second player in order to determine the matching result.

Thereafter, in response to the acceptance of the operation that the second player specifies the first player, the server (20) refers to the matching information database 2022 and establishes the matching of the first player and the second player. By determining that the matching is to be established, the server (20) makes the subfield "matching date" in the matching information database 2022 hold the information of a timing (for example, date and time) at which the matching is established.

In the state where the first player and the second player are matched, in response to the acceptance of the operation of canceling the matching from one or both of the players, the server (20) cancels the matching of the first player and the second player. The server (20) refers to the matching information database 2022 and makes the subfield "matching cancellation date" hold the information of the timing at which the matching is canceled, for the players of whom the matching is canceled. Thus, when the first player and the second player perform the input operation for the matching, the server (20) can refer to the matching information database 2022 and determine whether or not the matching has been established in the past. For a combination of the players who have established the matching but have canceled the matching in the past, the server (20) may not be able to establish the matching again.

In step S553, the server (20) provides the determined matching result to the terminal device (10).

In step S502, the terminal device (10) presents the determined matching result to the first player on the display or the like.

Figure 7:
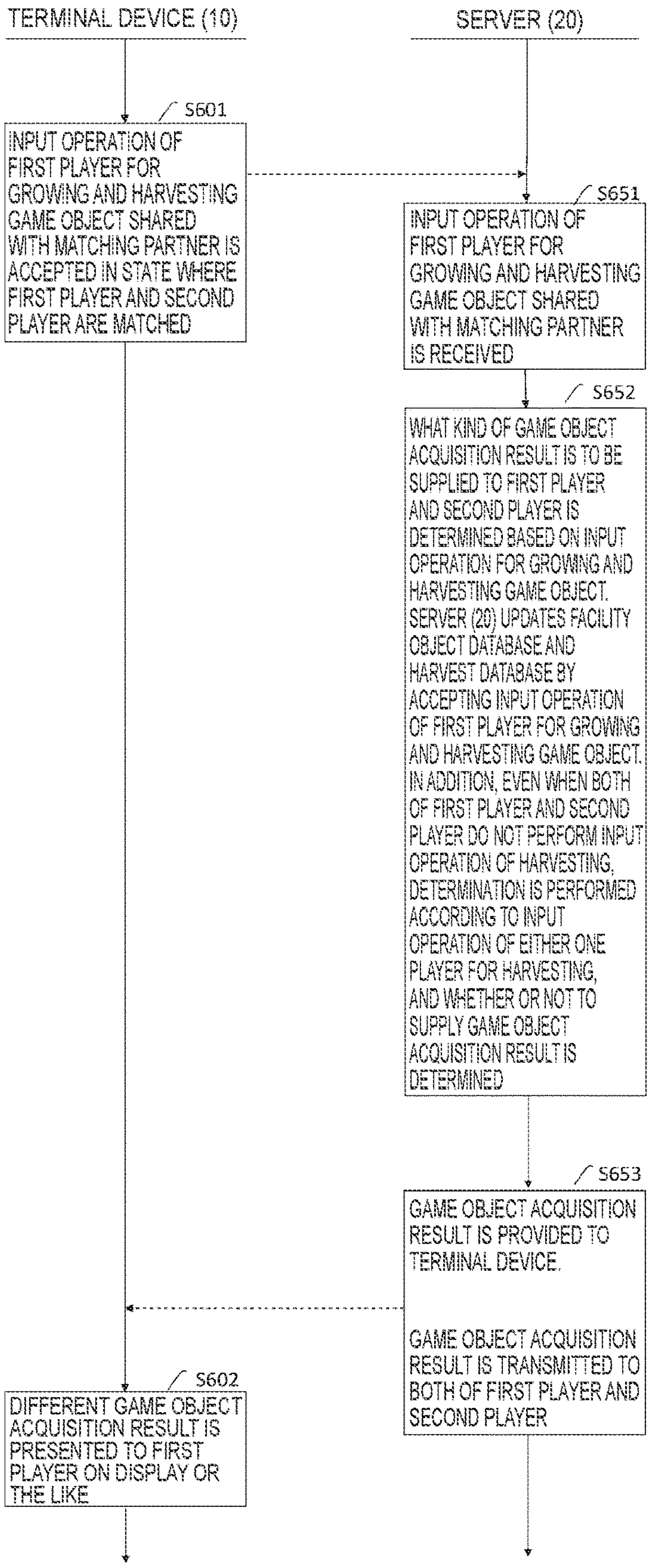
FIG. 7 is a diagram illustrating a flow of related processing of a harvesting operation.

FIG. 7 is a diagram illustrating the flow of related processing of a harvesting operation.

In step S601, the terminal device (10) accepts the input operation of the first player for growing and harvesting the game object shared with the matching partner in the state where the first player and the second player are matched.

In step S651, the server (20) receives the input operation of the first player for growing and harvesting the game object shared with the matching partner.

In step S652, the server (20) determines what kind of game object acquisition result is to be supplied to the first player and the second player based on the input operation for growing and harvesting the game object. The server (20) updates the facility object database 2025 and the harvest database 2028 by accepting the input operation of the first player for growing and harvesting the game object. For example, in the facility object database 2025, the server (20) refers to the harvest database 2028 by the subfield "ID of harvest grown at facility object" in response to the input operation of the first player for growing and harvesting the game object shared with the second player who is the matching partner, and supplies the game object acquisition result according to the subfield "number of pieces to be obtained upon harvest" in the harvest database 2028. In addition, even when both of the first player and the second player do not perform the input operation for harvesting, determination is performed according to the input operation of either one player for harvesting, and whether or not to supply the game object acquisition result is determined.

In step S653, the server (20) provides the game object acquisition result to the terminal device (10). The game object acquisition result is transmitted to both of the first player and the second player.

In step S602, the terminal device (10) presents a different game object acquisition result to the first player on the display or the like.

Figure 8:
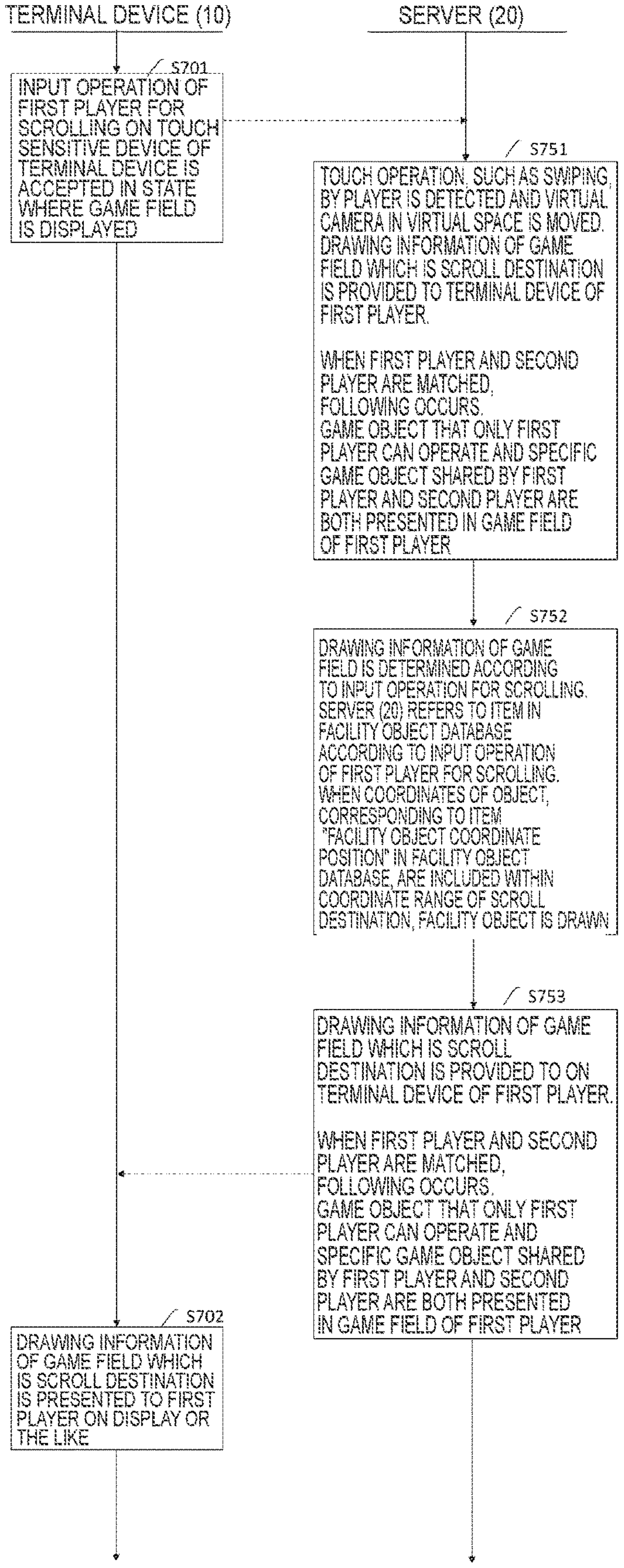
FIG. 8 is a diagram illustrating a flow of scroll processing of a game field.

FIG. 8 is a diagram illustrating the flow of scroll processing.

In step S701, the terminal device (10) accepts the input operation of the first player for scrolling on the touch sensitive device 131 of the terminal device (10) in the state where the game field is displayed.

In step S751, the server (20) detects a touch operation, such as swiping, by the player and moves a virtual camera in virtual space. The server (20) provides drawing information of the game field which is a scroll destination to the terminal device (10) of the first player. When the first player and the second player are matched, the following occurs. The game object that only the first player can operate and a specific game object shared by the first player and the second player are both presented in the game field of the first player.

In step S752, the server (20) determines the drawing information of the game field according to the input operation for scrolling. Here, by transmitting the information of the individual game objects arranged in the game field to the terminal device (10), the server (20) may cause the terminal device (10) to control the virtual camera according to the operation of scrolling the screen by the player, and may cause the terminal device (10) to perform rendering processing according to setting of the virtual camera.

The server (20) refers to the subfield of the facility object database 2025 according to the input operation of the first player for scrolling. When the coordinates of an object, corresponding to the subfield "facility object coordinate position" of the facility object database 2025, are included within a coordinate range of the scroll destination, the facility object is drawn.

In step S753, the server (20) provides the drawing information of the game field which is the scroll destination to the terminal device (10) of the first player. When the first player and the second player are matched, the following occurs. The game object that only the first player can operate and the specific game object shared by the first player and the second player are both presented in the game field of the first player.

In step S702, the terminal device (10) presents the drawing information of the game field which is the scroll destination to the first player on the display or the like.

Figure 9:
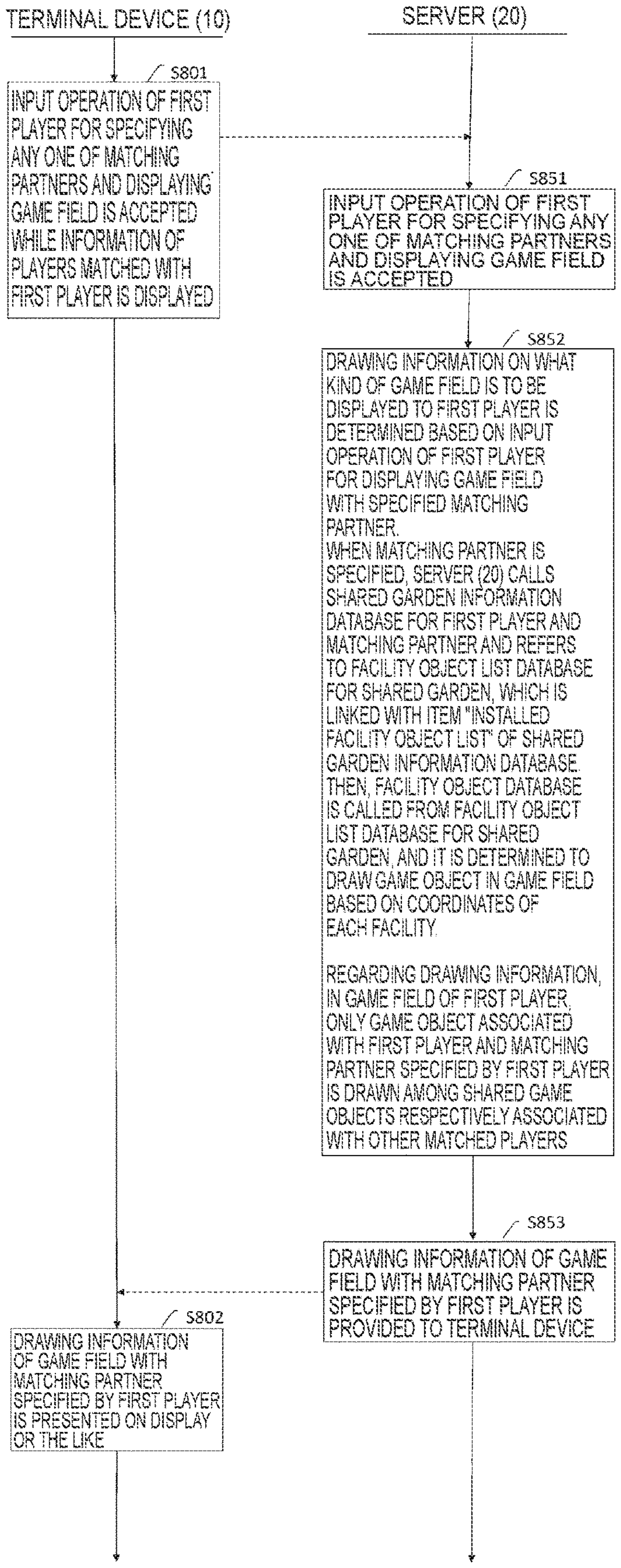
FIG. 9 is a diagram illustrating a flow of field display related processing with a matching partner.

FIG. 9 is a diagram illustrating the flow of field display related processing with the matching partner.

In step S801, the terminal device (10) accepts the input operation of the first player for specifying any one of the matching partners and displaying the game field while the information of the plurality of players matched with the first player is displayed.

In step S851, the server (20) accepts the input operation of the first player for specifying any one of the matching partners and displaying the game field.

In step S852, the server (20) determines the drawing information on what kind of game field is to be displayed to the first player based on the input operation of the first player for displaying the game field with the specified matching partner. When the matching partner is specified, the server (20) calls the shared garden information database 2024 for the first player and the matching partner and refers to the facility object list database 2027 for the shared garden, which is linked with the subfield "installed facility object list" of the shared garden information database 2024. Then, the server (20) calls the facility object database 2025 from the facility object list database 2027 for the shared garden and determines to draw the game object in the game field based on the coordinates of each facility.

Regarding the drawing information, the server (20) draws, in the game field of the first player, only the game object associated with the first player and the matching partner specified by the first player among the shared game objects respectively associated with the plurality of other matched players.

In step S853, the server (20) provides the drawing information of the game field with the matching partner specified by the first player to the terminal device (10).

In step S802, the terminal device (10) presents the drawing information of the game field with the matching partner specified by the first player to the first player on the display or the like.

Screen Example

FIG. 10 is a diagram illustrating the screen example when the game field with the matching partner is scrolled. As illustrated on a screen 1010 and a screen 1014, when the first player specifies Mr./Ms. X as the matching partner, the server (20) presents the information to the player so that the personal garden of the first player and the shared garden with the matching partner Mr./Ms. X are continuously displayed on the game field. In the illustrated example, by accepting the operation of swiping by the player on the screen 1010 in the terminal device (10), the operation of scrolling the screen is accepted from the player. Thus, the first player can move between the personal garden of the first player and the shared garden with the matching partner Mr./Ms. X just by scrolling the touch sensitive device 131 of the terminal device 10.

Figure 11:
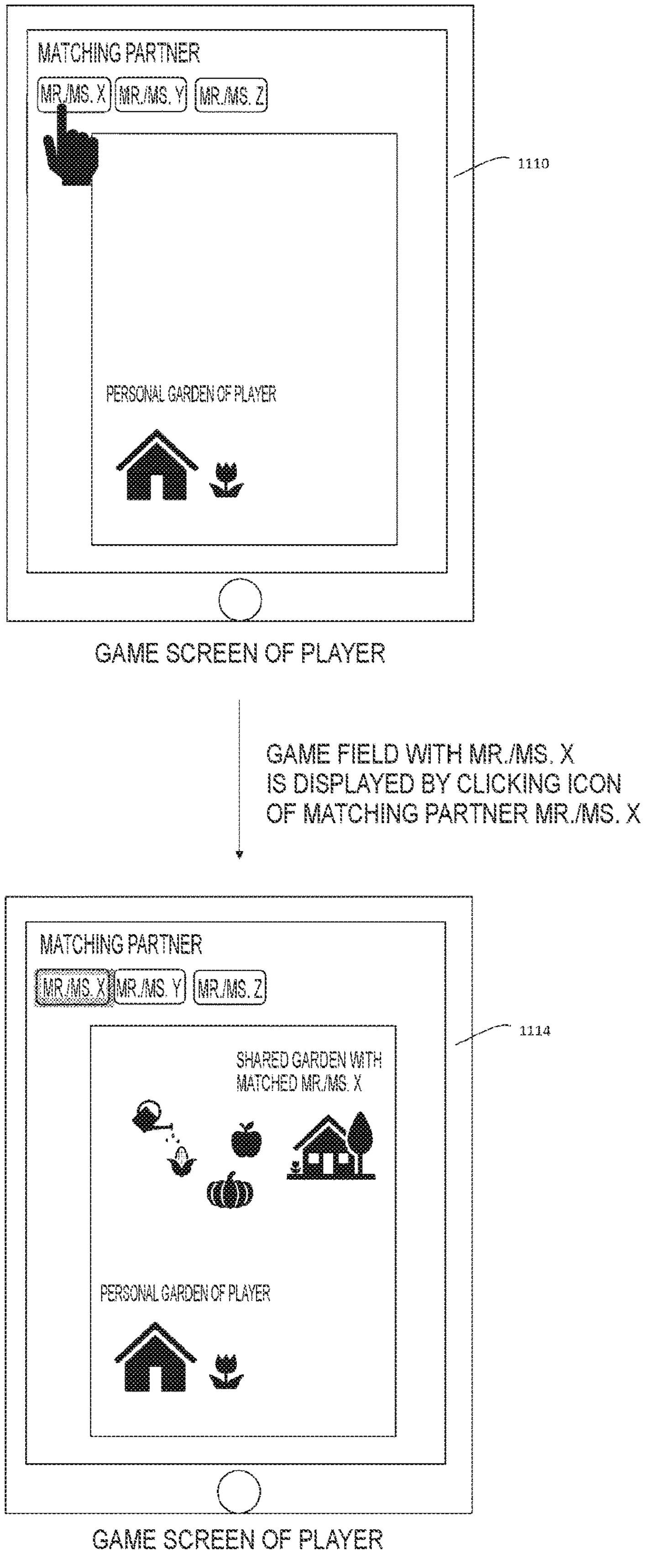
FIG. 11 is a diagram illustrating a screen example of selecting the game field with the matching partner.

FIG. 11 is a diagram illustrating the screen example of selecting the game field with the matching partner. As illustrated on a screen 1110, the server (20) accepts the operation that the first player specifies a button of the matching partner Mr./Ms. X from the plurality of matching partners. As illustrated on a screen 1114, the server (20) presents the information to the player so that the game field with the matching partner Mr./Ms. X is displayed in the game field of the first player but the game objects shared with the other matching partners ("Mr./Ms. Y" and "Mr./Ms. Z" in the illustrated example) are not drawn.

While some embodiments of the present disclosure are explained above, these embodiments can be embodied in a variety of other forms and various omissions, substitutions and changes can be made without departing from the spirit of the invention. The embodiments and modifications thereof are intended to be included in the invention described in the scope of claims and the equivalent range as would be included in the scope and spirit of the invention.

<Supplements>

Items explained in the individual embodiments above are supplemented below.

(Supplement 1)

A game program to be executed by a computer (20, 10) including a processor (29, 19), the game program causing the processor to execute the steps of:

presenting a first game field associated with a first player to the first player (S702);

matching the first player and a second player different from the first player based on an input operation of the first player and an input operation of the second player (S552); and associating a specific game object shared by the first player and the second player with the matched first player and second player (S852), wherein, in the presenting step (S802), the first game field is presented to the first player with both a game object that only the first player can operate and the specific game object arranged in the first game field.

(Supplement 2)

The game program according to supplement 1, wherein the specific game object is configured to enable the first player and the second player to acquire a different game object by establishment of a predetermined condition in a state where the first player and the second player are matched, and the game program causes the processor to further execute a step of accepting the input operation for acquiring the different game object only from the first player or the second player (S601).

(Supplement 3)

The game program according to supplement 2, wherein, in the accepting step (S601), at least one of the first player and the second player is caused to acquire the different game object according to the input operation of either one of the matched first player and second player for the acquisition even when both the first player and the second player do not perform the input operation (S652).

(Supplement 4)

The game program according to supplement 3, wherein, in the accepting step (S601), the first player and the second player are caused to acquire the different game object by accepting the input operation for the acquisition from one of the matched first player and second player (S653).

(Supplement 5)

The game program according to supplement 4, wherein a first game object for which the input operation is accepted only from the first player is arranged in the first game field, and a parameter of the first game object arranged in the first game field is changed by accepting the input operation using the different game object from the first player.

(Supplement 6)

The game program according to any one of supplements 1 to 5, wherein information of a plurality of other players matched with the first player is displayed on a screen for presenting the first game field to the first player, an operation of specifying any one of the plurality of other matched players is accepted from the first player (S801), and the specific game object associated with the specified player and the first player is arranged in the first game field in response to acceptance of the specifying operation (S802).

(Supplement 7)

The game program according to supplement 6, wherein, among the specific game objects each associated with respective one of the plurality of other matched players, only the specific game object associated with the player specified by the first player and the first player is arranged in the first field (S852).

(Supplement 8)

The game program according to supplement 7, wherein an area for arranging the specific game object in the first game field is fixed irrespective of which one of the other matched players is specified by the first player.

(Supplement 9)

A method executed by a computer (20, 10) including a processor (29, 19), the method comprising the steps of:

by the processor, presenting a first game field associated with a first player to the first player (S702);

matching the first player and a second player different from the first player based on an input operation of the first player and an input operation of the second player (S552); and associating a specific game object shared by the first player and the second player with the matched first player and second player (S852), wherein, in the presenting step (S802), the first game field is presented to the first player with both a game object that only the first player can operate and the specific game object arranged in the first game field.

(Supplement 10)

An information processing apparatus comprising a processor (29, 19), the processor of the information processing apparatus being configured to execute the steps of:

presenting a first game field associated with a first player to the first player (S702);

matching the first player and a second player different from the first player based on an input operation of the first player and an input operation of the second player (S552); and associating a specific game object shared by the first player and the second player with the matched first player and second player (S852), wherein, in the presenting step (S802), the first game field is presented to the first player with both a game object that only the first player can operate and the specific game object arranged in the first game field.

The invention claimed is:

1. A non-transitory computer readable medium storing a game program to be executed by a computer including a processor, the game program causing the processor to execute:

presenting a game field of a first player associated with the first player, to the first player;

matching the first player and a plurality of second players different from the first player, based on an input operation of the first player and an input operation of the plurality of second players; and associating a shared game object shared by the first player and the second players, respectively, with the plurality of second players matched with the first player, wherein the presenting comprises:

displaying information of the plurality of second players matched with the first player;

accepting a designating operation for designating any one of the plurality of second players, from the first player;

calling a shared space information database for the first player and the designated second player and referring to a facility object list database for a shared space linked with the shared space information database;

drawing, in the game field of the first player, only the shared game object associated with the first player and the designated second player among shared game objects respectively associated with other matched players, based on coordinates of each facility called from the facility object list database;

performing the presenting of the game field of the first player to the first player;

presenting the game field of the first player so that a personal space of the first player and a shared space with a designated second player are continuously displayed; and controlling visual movement in a virtual space between the personal space and the shared space in response to a user operation on a touch sensitive device of the first player.

2. The non-transitory computer readable medium according to claim 1, wherein the shared game object is configured to enable the first player and the second players to acquire a different game object by establishment of a predetermined condition in a state where the first and the second players are matched, and the game program causes the processor to execute accepting an input operation for acquiring the different game object only from the first player or an input operation for acquiring the different game object only from the second players matched with the first player.

3. The non-transitory computer readable medium according to claim 2, wherein the accepting comprises causing at least one of the first player and the second players matched with the first player to acquire the different game object even when both the first player and the second players matched with the first player do not perform the input operation for the acquisition.

4. The non-transitory computer readable medium according to claim 3, wherein the accepting comprises causing the first player and the second players matched with the first player to acquire the different game object.

5. The non-transitory computer readable medium according to claim 4, wherein the game program causes the processor to execute:

arranging a first game object for which the input operation for acquiring the different game object is accepted only from the first player, in the game field; and changing a parameter of the first game object arranged in the game field based on the acceptance of the input operation for acquiring the different game object from the first player.

6. The non-transitory computer readable medium according to claim 1, wherein the game program causes the processor to execute:

displaying information of a plurality of other players matched with the first player, on a screen on which the game field is displayed to the first player;

accepting an operation of specifying any one of the plurality of other matched players, from the first player; and arranging, in the game field, the shared game object associated with a specified player and the first player in response to acceptance of the operation of specifying.

7. The non-transitory computer readable medium according to claim 6, wherein the game program causes the processor to execute arranging, in the first field, only the shared game object associated with the first player and the specified player, among shared game objects each associated with respective one of the plurality of other matched players.

8. The non-transitory computer readable medium according to claim 7, wherein an area for arranging the shared game object in the game field is fixed irrespective of which one of the plurality of other players matched is specified by the first player.

9. A method executed by a computer including a processor, comprising:

presenting a game field of a first player associated with the first player, to the first player;

matching the first player and a plurality of second players different from the first player, based on an input operation of the first player and an input operation of the plurality of second players; and associating a shared game object shared by the first and the second players, respectively, with the plurality of second players matched with the first player, wherein the presenting comprises:

displaying information of the plurality of second players matched with the first player;

accepting a designating operation for designating any one of the plurality of second players, from the first player;

calling a shared space information database for the first player and the designated second player and referring to a facility object list database for a shared space linked with the shared space information database;

drawing, in the game field of the first player, only the shared game object associated with the first player and the designated second player among shared game objects respectively associated with other matched players, based on coordinates of each facility called from the facility object list database;

performing the presenting of the game field of the first player to the first: player;

presenting the game field of the first player so that a personal space of the first player and a shared space with a designated second player are continuously displayed; and controlling visual movement in a virtual space between the personal space and the shared space in response to a user operation on a touch sensitive device of the first player.

10. An information processing apparatus comprising a processor configured to execute:

presenting a game field of a first player associated with the first player, to the first player;

matching the first player and a plurality of second players different from the first player, based on an input operation of the first player and an input operation of the plurality of second players; and associating a shared game object shared by the first and the second players, respectively, with the plurality of second players matched with the first player, wherein the presenting comprises:

displaying information of the plurality of second players matched with the first player;

accepting a designating operation for designating any one of the plurality of second players, from the first player;

calling a shared space information database for the first player and the designated second player and referring to a facility object list database for a shared space linked with the shared space information database;

drawing, in the game field of the first player, only the shared game object associated with the first player and the designated second player among shared game objects respectively associated with other matched players, based on coordinates of each facility called from the facility object list database;

performing the presenting of the game field of the first player to the first player;

presenting the game field of the first player so that a personal space of the first player and a shared space with a designated second player are continuously displayed; and controlling visual movement in a virtual space between the personal space and the shared space in response to a user operation on a touch sensitive device of the first player.

* * * * *